US008776241B2

(12) United States Patent
Zaitsev

(10) Patent No.: US 8,776,241 B2
(45) Date of Patent: Jul. 8, 2014

(54) AUTOMATIC ANALYSIS OF SECURITY RELATED INCIDENTS IN COMPUTER NETWORKS

(75) Inventor: Oleg Zaitsev, Smolensk (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/219,887

(22) Filed: Aug. 29, 2011

(65) Prior Publication Data

US 2013/0055399 A1 Feb. 28, 2013

(51) Int. Cl.
*H04L 29/06* (2006.01)
(52) U.S. Cl.
USPC .............................. 726/25; 726/23
(58) Field of Classification Search
USPC ...................................... 726/23–25
See application file for complete search history.

(56) References Cited

U.S. PATENT DOCUMENTS

| | | | |
|---|---|---|---|
| 6,530,024 B1 | 3/2003 | Proctor | |
| 7,080,287 B2 | 7/2006 | Salem | |
| 7,159,237 B2 | 1/2007 | Schneier et al. | |
| 7,257,514 B2 | 8/2007 | Faihe | |
| 7,260,844 B1 | 8/2007 | Tidwell et al. | |
| 7,461,036 B2 | 12/2008 | Genty et al. | |
| 8,225,407 B1 * | 7/2012 | Thrower et al. | 726/25 |
| 2002/0019945 A1 | 2/2002 | Houston et al. | |
| 2004/0039804 A1 | 2/2004 | Carr et al. | |
| 2004/0143753 A1 * | 7/2004 | Hernacki et al. | 713/200 |
| 2004/0250112 A1 * | 12/2004 | Valente et al. | 713/200 |
| 2004/0250124 A1 | 12/2004 | Chesla et al. | |
| 2004/0260947 A1 | 12/2004 | Brady et al. | |
| 2006/0156380 A1 * | 7/2006 | Gladstone et al. | 726/1 |
| 2006/0218108 A1 | 9/2006 | Panfilov et al. | |
| 2007/0094728 A1 | 4/2007 | Julisch et al. | |

(Continued)

FOREIGN PATENT DOCUMENTS

| | | | | |
|---|---|---|---|---|
| RU | 9691 U1 * | 1/2006 | | G06F 21/22 |
| RU | 2390839 | 5/2010 | | |

(Continued)

OTHER PUBLICATIONS

Translation into English of RU 96 991 U1.*

(Continued)

*Primary Examiner* — Justin T Darrow
(74) *Attorney, Agent, or Firm* — Patterson Thuente Pedersen, PA

(57) ABSTRACT

Solutions for responding to security-related incidents in a computer network, including a security server, and a client-side arrangement. The security server includes an event collection module communicatively coupled to the computer network, an event analysis module operatively coupled to the event collection module, and a solution module operatively coupled to the event analysis module. The event collection module is configured to obtain incident-related information that includes event-level information from at least one client computer of the plurality of client computers, the incident-related information being associated with at least a first incident which was detected by that at least one client computer and provided to the event collection module in response to that detection. The event analysis module is configured to reconstruct at least one chain of events causally related to the first incident and indicative of a root cause of the first incident based on the incident-related information. The solution module is configured to formulate at least one recommendation for use by the at least one client computer, the at least one recommendation being based on the at least one chain of events, and including corrective/preventive action particularized for responding to the first incident.

22 Claims, 9 Drawing Sheets

(56) References Cited

U.S. PATENT DOCUMENTS

| 2007/0143843 | A1 | 6/2007 | Nason et al. |
| 2007/0266138 | A1 | 11/2007 | Spire et al. |
| 2009/0222876 | A1 | 9/2009 | Goldberg et al. |
| 2010/0319069 | A1* | 12/2010 | Granstedt et al. ............... 726/22 |

FOREIGN PATENT DOCUMENTS

| RU | 96991 | 8/2010 |
| WO | WO0125935 | 4/2001 |
| WO | WO2006/071985 | 7/2006 |

OTHER PUBLICATIONS

European Search Report for European Application No. EP12158171 dated Jun. 20, 2012.
Hutton, "Preparing for Security Event Management: Methods and tactics for avoiding failure in large SEM implementations", Information Security. www.360is.com, Oct. 2007.
Wu et al., "The Use of Computational Intelligence in Intrusion Detection Systems: A Review", vol. 10, No. 1. pp. 1-35, Applied Soft Computing, Jan. 1, 2010.
EventLog Analyzer 6 Managed Server—User Guide. © 2009 Zoho Corp. www.eventloganalyzer.com. 175 pages. Jul. 9, 2010.
ManageEngine® Eventlog Analyzer 5. Product Brochure. © 2009 Zoho Corp. 2 pages. Jun. 25, 2009.
Swift, David, "A Practical Application of SIM/SEM/SIEM Automating Threat Identification SANS Institute InfoSec Reading Room" dated Dec. 23, 2006. © 2007 SANS Institute. 41 pages.
Wikipedia, "Security Event Manager" as accessed on Dec. 19, 2012. http://en.wikipedia.org/wiki/Security_Event_Manager.
Wikipedia, "Computer security incident management" as accessed on Dec. 19, 2012. http://en.wikipedia.org/wiki/Computer_security_incident_management.
Russian Search Report for Russian Application No. 2011132618/08(048107) dated Aug. 4, 2011.
Cepiok, "Features of use of practical tools for the detection and investigation of security incidents" dated May 31, 2012. English Machine Translation provided.
Kukanova, "Information Security Incident Management-the frequency and number of incidents related to information security, clear indicators of the safety management system", dated Dec. 28, 2010. English Machine Translation provided.

* cited by examiner

AUTOMATIC ANALYSIS OF SECURITY RELATED INCIDENTS IN COMPUTER NETWORKS

FIELD OF THE INVENTION

The invention relates generally to information systems and, more particularly, to systems and methods of automatic investigation of security-related incidents in computer networks.

BACKGROUND OF THE INVENTION

Security of computer networks and of individual computer systems that make up the nodes of the network, is of particular importance in the corporate environment. Leakage of information stored and processed in a company's computer network could lead to massive losses and liability. Accordingly, significant development efforts in information security is being undertaken.

Security personnel and law enforcement agencies must have the proper means to identify and investigate possible security breaches, and find and prosecute malicious actors responsible for those breaches. It is also desirable to prevent similar incidents from being repeated in the future. The investigation of unauthorized acts is carried out in an incident-oriented approach. The essence of this approach is the sampling the input data that preceded, and that may have played a role in the cause of the incident, sorting this data, analyzing it to determine possible causes of the incident, and developing solutions to correct the incident and prevent its recurrence in the future. Conducting this investigation should preferably be prompt and easy to manage.

Systems currently exist which allow for collection of information about events on users' computers, selection of events that may have caused harm, and sending of reports to the security service. However, there are several issues that remain inadequately addressed. One such issue is that existing systems present the data in the form of disparate events, for example, "a virus is found" or "antivirus failure." This information, without more, is not particularly helpful in determining the root cause of an incident.

Another problem faced by conventional event monitoring systems is that they do not allow certain events to be singled out from among others for ranking purposes. Such a capability would allow for unnecessary information to be removed from the event log and save critical events as long as possible. Experience shows that for the proper investigation of certain incidents the events over a period of several years (2-3 years) must be analyzed. This problem leads to the fact that for the investigation of a particular incident, human experts cannot reasonably expected to take on the review of such a volume of data representing similar incidents over these huge time periods.

Another shortcoming is the inability of systems to integrate into computer networks with a large number of personal computers (PCs), because current records of events, as a result of becoming a large unordered data set, cannot be analyzed by a non-specialist, and would take a specialist a lot of time to analyze.

For these, and other reasons, there remains a need to more efficiently and effectively meet the challenge of investigating security incidents in a computer network.

SUMMARY OF THE INVENTION

One aspect of the invention is directed to addressing the investigation of security incidents in computer networks, fixing of their consequences, and prevention of their recurrence.

A security server for responding to security-related incidents in a computer network according to one aspect of the invention includes an event collection module communicatively coupled to the computer network, an event analysis module operatively coupled to the event collection module, and a solution module operatively coupled to the event analysis module. The event collection module is configured to obtain incident-related information that includes event-level information from at least one client computer of the plurality of client computers, the incident-related information being associated with at least a first incident which was detected by that at least one client computer and provided to the event collection module in response to that detection. The event analysis module is configured to reconstruct at least one chain of events causally related to the first incident and indicative of a root cause of the first incident based on the incident-related information. The solution module is configured to formulate at least one recommendation for use by the at least one client computer, the at least one recommendation being based on the at least one chain of events, and including corrective/preventive action particularized for responding to the first incident.

In another aspect of the invention, a method for automatically responding to security-related incidents at a client computer is provided. The client computer operates at least one protection set module that is adapted to protect information stored at the client computer and to detect occurrences of security-related incidents. The client computer logs event-level records representing activity of the at least one protection set module. The at least one protection set module detects an incident impacting information security at the client computer, the detecting being performed based on incident detection criteria. In response to the detecting of the incident, the client computer associates selected ones of the event-level records with the incident, the associating being performed based on incident associating criteria. The client computer provides the selected ones of the event-level records to a remote server to be analyzed. The client computer receives at least one recommendation for corrective action to be carried out at the client computer, the recommendation for corrective action being received from the remote server, and including instructions for resolving the incident. The client computer executes the instructions for resolving the incident. The client computer can receive an instruction to update at least one of: the incident detection criteria, the incident associating criteria, or a combination thereof, with a new set of respective criteria.

Advantageously, aspects of the invention reduce the time spent on investigating security incidents through improved detection, correction and prevention of security incidents. The system and method described below can also detect suspicious events in a computer network, analyze them and find solutions to remedy the consequences of such events and adjust the system to prevent the recurrence of events.

A number of other advantages will become apparent from the following Detailed Description of the Preferred Embodiments.

BRIEF DESCRIPTION OF THE DRAWINGS

The invention may be more completely understood in consideration of the following detailed description of various embodiments of the invention in connection with the accompanying drawings, in which.

Figure 1:
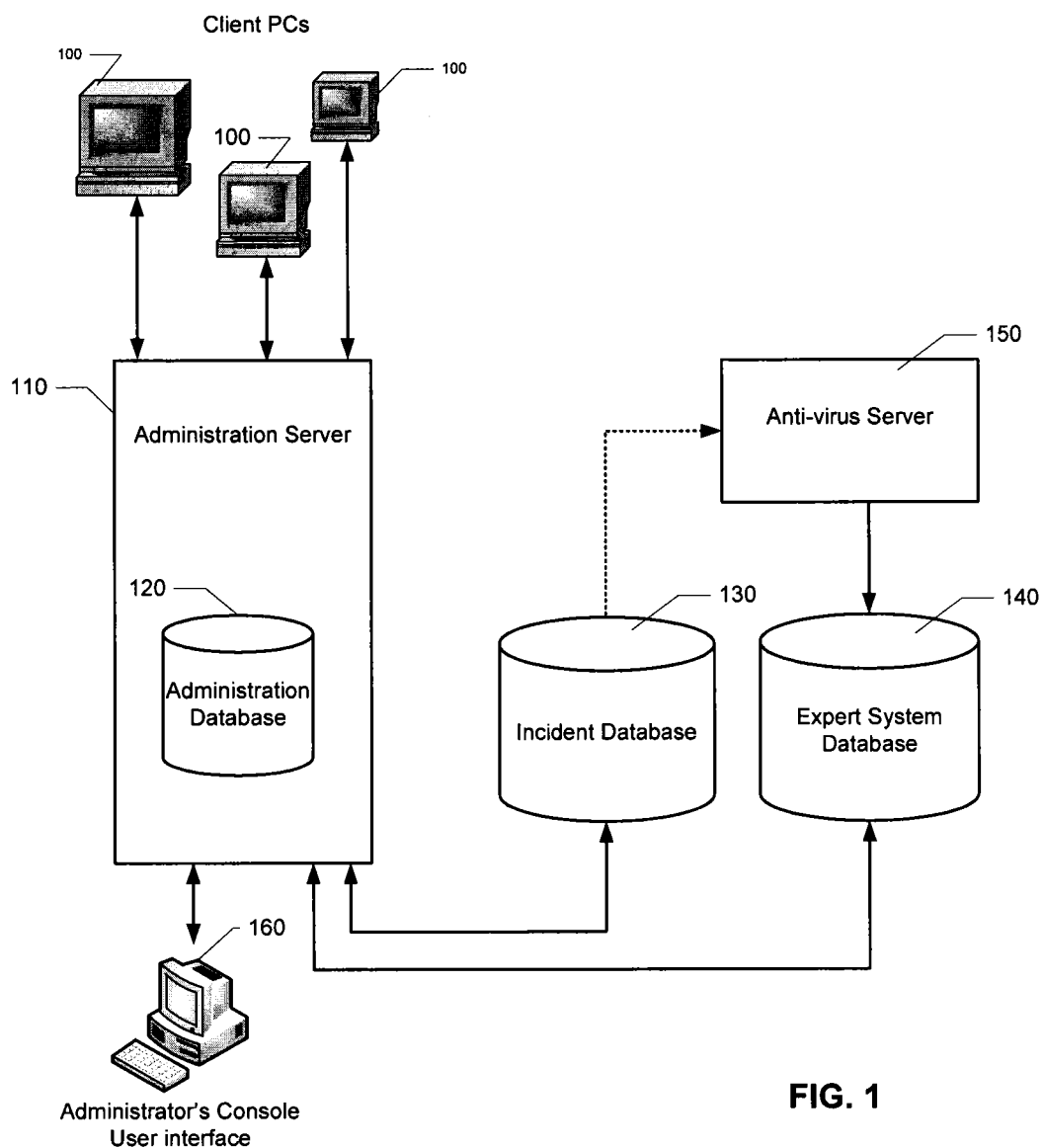
FIG. 1 is a block diagram illustrating a system for investigation of security-related incidents according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

A computer security system at an enterprise typically includes a centralized security server which is coupled to distributed client PCs. There may be one or more a variety of network topologies with which the distributed PCs are coupled to the security server including, for example, star, tree, ring, mesh, bus, and the like, or any combination thereof. The security server is designed to collect information about incidents and actions performed on each PC and on the network interconnecting them, as well as for remotely controlling PCs and updating their settings.

Aspects of the present invention can be implemented as part of such a security server, or as a specialized, dedicated computer system coupled to the computer network. The computer system can be one physical system, or can be distributed among multiple physical machines, such as by role or function, or by process thread in the case of a cloud computing distributed model. In various embodiments, aspects of the invention can be configured to run in virtual machines that in turn are executed on one or more physical machines. For the sake of brevity, the embodiments discussed herein shall be in the context of a security server. It will be understood by persons of skill in the art that features of the invention may be realized by a variety of different suitable machine implementations.

Figure 6:
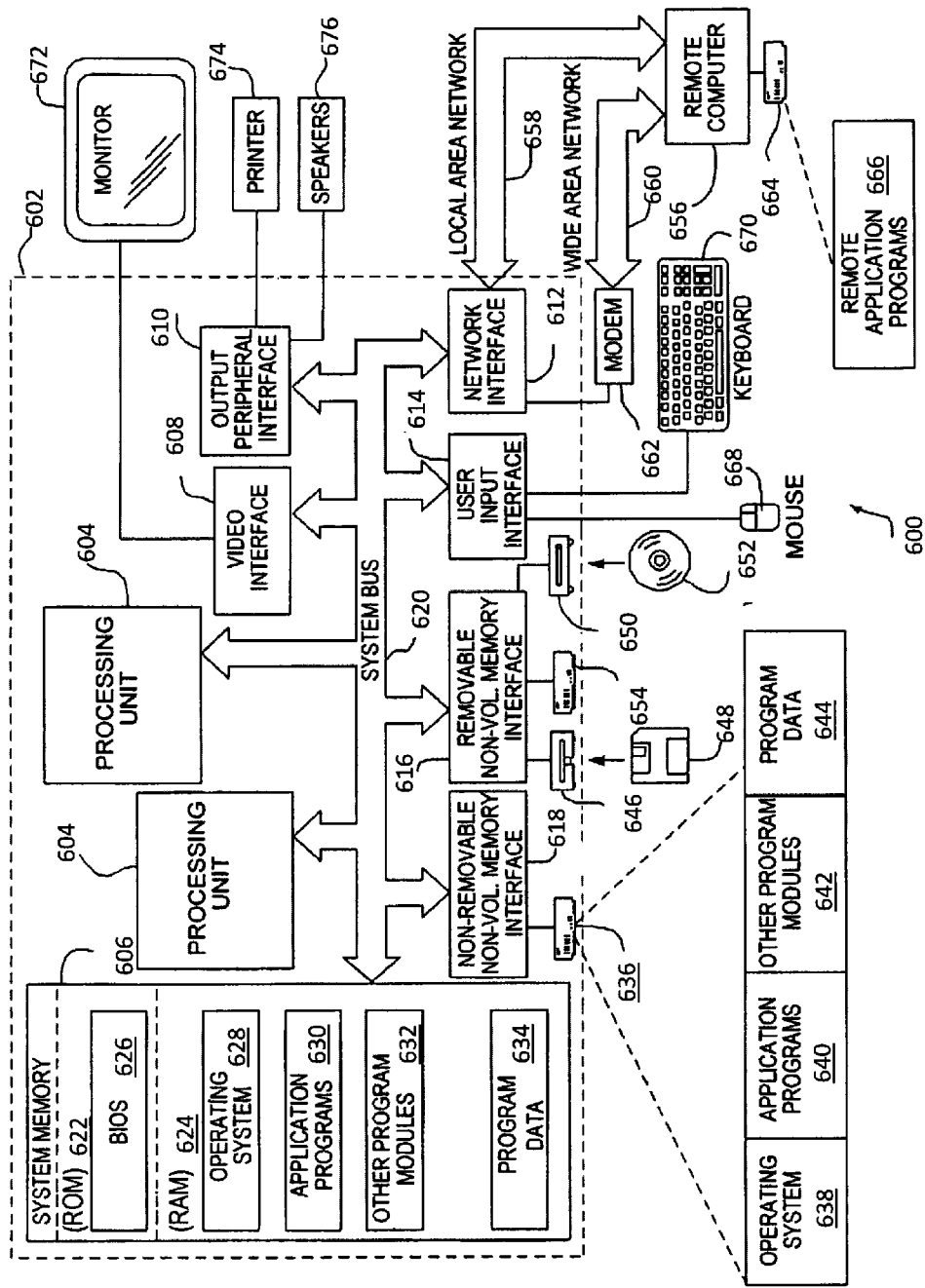
FIG. 6 is a diagram illustrating an example of a general-purpose computer system on which aspects of the invention as described herein may be implemented according to various embodiments.

FIG. 6 and its associated description below detail an example of a physical general-purpose computer system that can be programmed to operate as a security server or as a client computer system. When programmed to execute security server functionality according to embodiments of the invention, the general purpose computer system is to be regarded as a special-purpose apparatus, the functionality of which includes carrying out processes according to aspects of the invention.

FIG. 1 is a block diagram illustrating automatic investigation of security incidents according to one example embodiment. The security system includes the following components: administration server 110, administration database 120, incidents database 130, expert system database 140, and anti-virus server 150. Client PCs 100 are coupled to the system via administration server 110. Console 160 provides a user interface for the administrator of the security system.

In various embodiments, administration server 110, anti-virus server 150 are implemented as modules. The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of a general purpose computer (such as the one described in greater detail below in connection with FIG. 6) that executes an operating system, system programs, and application programs, while also implementing the module using multitasking, multithreading, distributed (e.g., cloud) processing, or other such techniques. Accordingly, each module can be realized in a variety of suitable configurations, and should not be limited to any particular implementation exemplified herein.

At an overview level, a security arrangement according to various embodiments of the invention provides a security server that responds to incidents occurring at one or more of the client PCs on the network. An incident is an event or series of events attributable to a human root cause. Further, as used herein, the term incident relates particularly to events or series of events impacting security in a computer system or network. Incidents are detected from an event or series of events at each PC. In response thereto, the security server automatically analyzes each incident, and applies corrective and preventive actions. An event is an observable change to the normal behavior of a system, process, application, configuration, workflow or the like.

In one embodiment, incidents are identified at the client side (i.e. client PCs 100) using specialized automated software running on the each client PC 100. The specialized automated software is preconfigured with criteria for what events or combinations of events constitute incidents. Examples of incidents include, without limitation, detection of malicious software, network attack detection, detection of critical violations in the work of an anti-virus program, and the like. The de-centralized approach of detecting an occurrence of an incident according to this embodiment allows efficient use of communications resources such as networking bandwidth, since only the events that constitute, or are associated with, a detected incident are transmitted to a remote server for analysis.

In a related embodiment, the specialized automated software permits an administrator at console 160 to define additional criteria for what constitutes an incident, and to push or otherwise transmit the updated criteria to each client PC 100 via administration server 110. In another related embodiment, incident analyzer 130 is programmed to automatically establish new criteria for what constitutes an incident, and administration server 110 is programmed to disseminate the new criteria throughout the network of PCs 100. In general, incidents are identified in response to a decision having been made, either by direct observation, by deduction, or inferentially.

When an incident is detected in a network of PCs 100, the details underlying the incident, such as the events upon which the incident was detected, as well as (in some embodiments) all, or select categories of, events preceding or leading up to the incident, are relayed to the administration server 110 and stored in the administration database 120. This event-level information can have details akin to that of syslog, SNMP, or the information contained in the likes of Microsoft Windows Event Log or Windows Security Log, or transmitted by Microsoft's Event Collector service, for example. Various degrees of detail are contemplated for event-level information, and these examples should in no way be deemed limiting insofar as the scope of the invention is concerned, unless expressly limited in any of the claims.

In one embodiment, incidents are analyzed by a specialist who is provided access to the system via console 160. The specialist is provided access to both, the administration database 120, and incidents database 130, with the latter containing information about incidents that have been previously analyzed. Expert system database 140, which is accessible to the specialist via console 160, contains information on causes and solutions to various incidents, Expert system database 140 is updatable, with updates coming from anti-virus servers 150, which may be operated by a third party such as a security services provider, for instance.

Having analyzed the events, incident the specialist associates them with known or newly-defined incidents and records a description of each incident in the incidents database 130. This database is filled with incidents with a much lower rate than a similar database of events only, resulting in ability to keep records of incidents a few years. Some of the proposed expert system solutions can be implemented automatically.

If the specialist agrees with these decisions, he/she confirms their implementation. In response, administration server 110 is passed the necessary commands that are transmitted to the client PC 100. Commands may or may not be directed to a single PC; they may also be in the form of global solutions, such as disabling autorun on the group level or even of all PCs 100 on the network.

In a related embodiment, results of the corrective action(s) taken is entered in the description of the incident. Statistical data on incidents and acceptance or rejection of the measures can be passed anonymously to the anti-virus server for the accumulation of statistics and subsequent adjustment of the rules base of the expert system.

The approach described in the embodiments above may be suitable in smaller networks. However, in larger organizations the amount of incident-related information to be analyzed or otherwise processed can become unwieldy. Accordingly, another aspect of the invention, described below in the context of the following exemplary embodiments, is directed to improving or optimizing the processing of incident data so as to reduce the volume of information to be stored or otherwise tracked.

Figure 2:
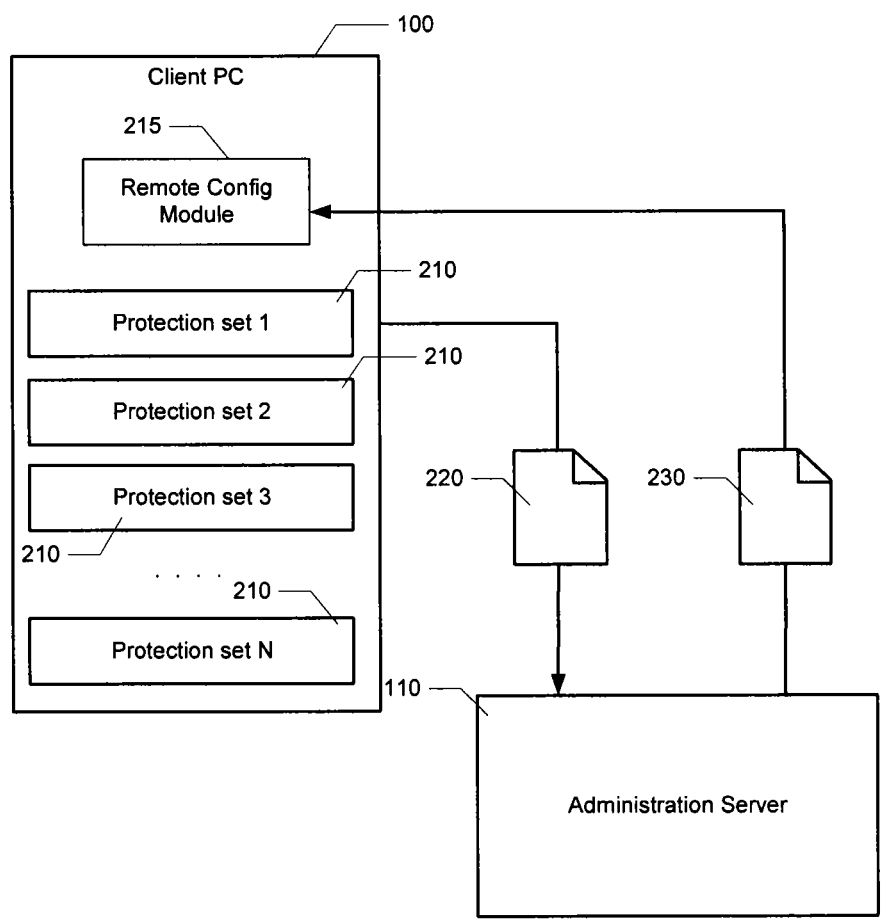
FIG. 2 illustrates a functional scheme of data exchange between an administration server and a client PC according to one embodiment.

One exemplary process of managing PCs 100 coupled to the administration server is illustrated in more detail in FIG. 2. To protect information on client PCs 100, protection sets 210 are installed. Each of protection sets 210 can be regarded as a separate module, or can be combined with other protection sets as a unified module. The composition of the protection sets may vary according to various embodiments, but they generally include an anti-virus engine that scans the computer system for malicious components and fixes any infected files. In related embodiments, protection sets 210 include a firewall, an intrusion detection/prevention system, message filtering, and application control.

In one type of embodiment, protection sets 210 include a set of parameters which are controlled by the administration server. In one such embodiment, the set of parameters include parameters that define incident detection rules; in another embodiment, the set of parameters include rules for applying corrective/preventive actions to remove or neutralize current threats or create immunity against potential future threats.

For example, access to an undesirable or dangerous web resource may be blocked in the firewall configuration rules for filtering network traffic on client PC 100. Built-in operating system security services can also be considered as a protection set 210 and can support a security policy in the network.

In a related embodiment, each client PC 100 includes a remote configuration module 215 that accepts commands and data from administration server 110 and applies them to the protection sets 210. Remote configuration module 215 can be a separate module, as shown, that interfaces with each of the protection sets 210 through the running of scripts or modifying configuration files for each protection set 210. In a particular embodiment, remote configuration module 215 facilitates the ability of the administration server 110 to modify operation of third-party protection sets 210 which are not designed to interface directly with administration server 110. In this embodiment, remote configuration module 215 either determines the type(s) of third-party protection sets 210 that are present on client PC 100 and communicates that determination to administration server 110, or collects information about the third-party protection sets and communicates that information to administration server 110, which in turn determines the type(s) of third-party protection sets that are available on client PC 100. Knowing the type(s) of protection sets that are available on client PC 100, administration server 110 provides protection set-specific configuration instructions in the form of a script, for instance, or protection set-specific configuration instructions in some other form to be converted into a script executable on client PC 100, to remote configuration module 215, which proceeds to cause the protection set-specific instructions to be carried out on client PC 100.

In another embodiment, remote configuration module (or the function thereof) is fully integrated into each of the protection sets 210, such that each protection set 210 may directly interface with administration server 110. In a related embodiment, protection sets 210 are executed in user mode, but the remote configuration module 215 is accessible only with administrator privileges.

In one embodiment, protection sets 210 log their activities as journal entries or event records. In another embodiment, a separate monitoring module monitors the activities of protection sets 210, and makes log entries based thereupon. Based on the journal entries or event records, periodic or spontaneous reports 220 are generated. The information reported in report 220 can be presented in different formats: e.g., text file, binary file, database records, etc.

In one embodiment, each report 220 is generated in response to a determination by any of the protection sets 210 that an event (or series of events) constituting an incident has/have occurred. The determination of the occurrence of the incident is performed based on incident detection criteria, which in a related embodiment may be updated from a remote machine, such as from administration server 110. In response to a detection of an incident, certain ones of the journal entries or event records that have been logged are associated with that incident, and those associated logged items are added to the report 220. The process of making this association is carried out by protection sets 210, or by a dedicated module, for example, and is based on incident associating criteria which have been configured into each client computer. Each report may include the system time of each event (i.e., a date-time stamp), the error code and/or type(s) of incident(s) detected.

Report 220 is passed to the administration server 110, where analysis is conducted thereupon. Transmission of report 220 according one type of embodiment is automatically initiated by any one of protection sets 210, or by a coordinating module such as remote configuration module 215, for example. In another type of embodiment, transmission of report 220 is carried out in response to an instruction originating in administration server 110.

Further, in a related embodiment, administration server 110 may obtain additional information if needed from the reporting PC 100. For example, when events like "virus detected" or "attack detected" take place, the administration server 110 is passed extensive information such as the type, serial number and date of connection of removable media if a virus is found on that media; data on who created the infected object in a public folder in the case where a virus is found in this folder; in case of network incidents, information about the network interface device (e.g., wi-fi adapter, Ethernet card, modem, or other network interface adapters involved in the network communication). The additional information may be transmitted automatically by client PC 100 based on client PC's own decision regarding the severity of the detected incident. In another embodiment, the additional information is requested by administration server 110, and sent by client PC 100 in response to that request. In a further embodiment, the additional information may be requested from another PC 100 which is different from the PC 100 on which the incident being analyzed was detected. This approach may be beneficial, for example, when the PC 100 on which the incident was detected was determined to have conducted exchange of data with the separate PC 100 from which the additional information is requested.

After analysis of the data, recommendations 230 for corrective action, are generated by administration server 110, which determines how they are to be presented to, or applied at, client PC 100. Some recommendations 230 may be automatically assigned and sent to one or more client PCs 100.

In one example of automatic application of the recommendations, consider an incident of infection of a PC from a flash memory device. In this case, the system is configured to automatically lock flash devices with the specific serial number on all or selected PCs 100. There are other possible options for recommendations for use in automatic mode— such as blocking all media on a given PC, the implementation of advanced scanning, and the like.

In the absence of the analysis of incident reports presented to the security administrator at console 160, reports at the administration server 110, would appear as shown in Table 1:

TABLE 1

| 09-BUH-5 | 2009-08-13 10:12:09.000 | E:\.System\S-1-6-21-2434476501-1644491937-600003311-1213\Autorun.exe | Trojan.Win32.Buzus.arrw |
|---|---|---|---|

This data is very difficult to correctly interpret by a non-specialist. Even if the security administrator is well-versed in protecting computers from malware and attacks, he/she may not always know how to restore the system in case of infection. This is one of the problems solved by the automatic incident investigation system according to certain embodiments described herein. Having processed the raw data and requested additional information, the system is capable of using knowledge stored in incidents database 130 and expert system database 140, for generating a report that will be understood by mid-level professionals, and in some cases to even resolve the problem automatically. Reports of events according to one such embodiment have an entirely new presentation, as shown in the example of Table 2.

TABLE 2

13.08.2009 at 10:10 PC 09-BUH-5 (IP = 192.168.0.114, accountant Sidorov) was connected to Flash-drive Transcend JetFlash V30 (4 GB, SN: 1234567890) which is not registered in the database of office-based Flash-drives.
Checking with anti-virus monitor showed that the drive was infected with malware Trojan.Win32.Buzus.arrw (infected file: E:\System\S-1-6-21-2434476501-1644491937-600003311-1213\Autorun.exe).
Malware was successfully neutralized by the anti-virus monitor.
On this PC the anti-virus monitor has fixed 4 similar incidents, the nearest - 12.08.2009 [more].
11.08.2009 above Flash-drive appeared in the incident on the PC 09-GLBUH [more].
Recommendations:

1. Lock the Flash drives for Transcend JetFlash V30 SN: 1234567890 09 for PC-BUH-5 [Run] For all PCs of group "1" [Run] or a global rule to ban work with data storage for all groups [Run]
2. Disable ability to work with Flash drives for PC 09-BUH-5 [Run]
Completed:

1. Check Flash drive for viruses with treatment [done - details]

In the square brackets of the example shown in Table 2 are interactive elements such as hyperlinks, the clicking of which leads to performance of certain actions to configure or display additional information. This example report uses the same data as in the previous example shown in Table 1, along with some additional information and history of incidents. The presentation contains consolidated data in an accessible format to administrators or authorized users, indicates the essential characteristics of the incident, indicates the time of the incident, and identifies the incident's discernable (if any) or likely cause(s).

One notable feature of the report according to this example is the corrective actions that are recommended to be carried out. In one such embodiment, when the any of the corrective actions are later applied, the report is amended to indicated "Completed" for those particular corrective actions. In a related embodiment, an interactive function, "cancel," is included in the report, which allows an administrator or user with sufficient privileges, to discontinue that corrective action.

In another related embodiment, the incident description includes a log of manual actions taken by the administrator and added by him/her as they are implemented. This feature supports maintaining administrative records, such as, for example, "requested an explanatory note from the user", "received an explanatory memorandum", "made the decision to increase web browsing content filtering for this user due to repeated viral incidents," etc.

Figure 3A:
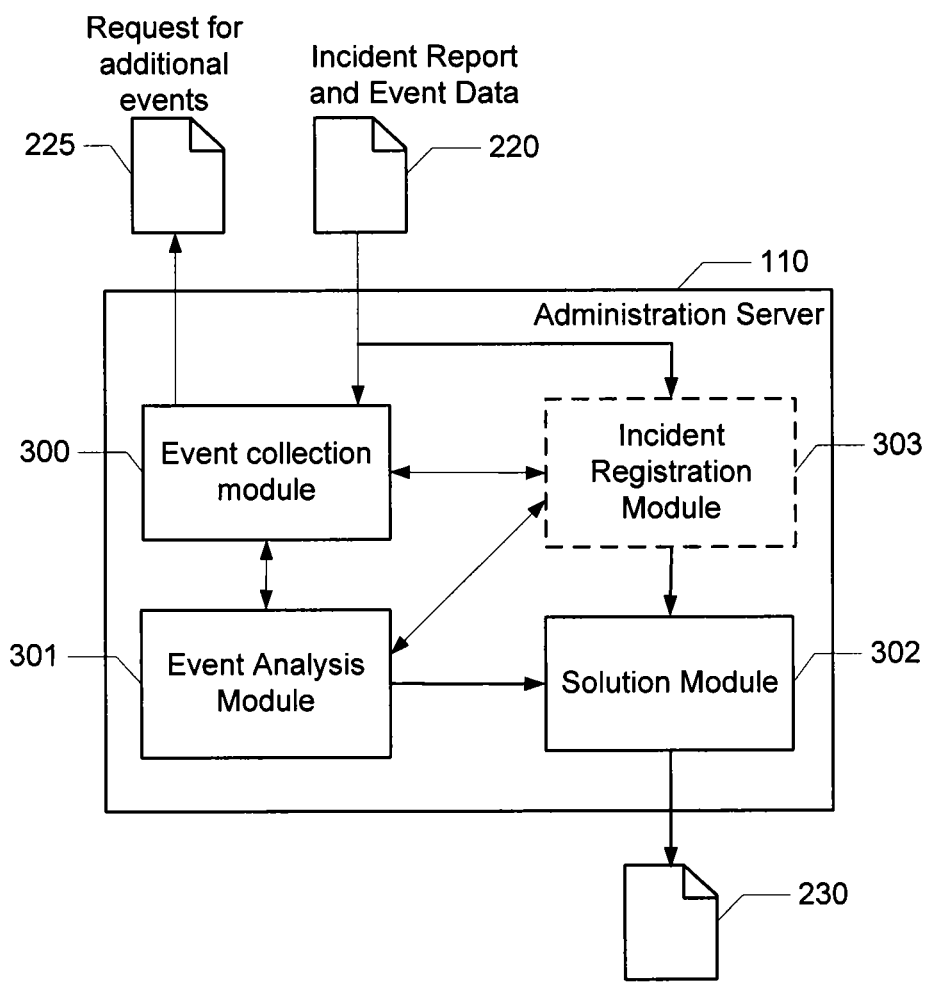
FIG. 3A is a diagram illustrating a system for automatic investigation of security-related incidents according to one embodiment.

FIG. 3A illustrates a system for automatically analyzing incidents relating to security of the computer system according to one type of embodiment. The system includes event collection module 300, solution module 302, incident registration module 303, and event analysis module 301.

The system may be implemented as part of administration server 110 and thus coupled with a computer network.

In one example embodiment, a primary function of event collection module 300 is to load data representing system events (such as those reported in report 220 by client PCs 100). Event collection data of interest includes reports generated by various programs, as well as system logs and reports. Exemplary content of such reports includes records of user actions, requests by software, network queries, etc. Obtaining of the system event data can be accomplished in several stages, For instance, high-level event data can be obtained; then, if necessary, low-level event data. High-level event data include such items as file operations, change permissions, running of programs. Low-level events include the program commands, network packet information, memory access processes, blocking of incoming packet data, etc.

Incident registration module 303 records the occurrence of the incident. In one embodiment, incident registration module 303 performs a more in-depth detection of the incident based on the event-level data collected by event collection module 300. In this type of approach, the incident detection criteria at client PC 100 can be over-inclusive of incidents, i.e., more sensitive, given that additional scrutiny is applied by an incident registration module 303 that performs a further detection of the occurrence of an incident.

Alternatively, since incident detection is implemented at client PC 100 e.g., by protection sets 210 such as an anti-virus engine, firewall or other such security mechanism that has an advanced analysis capability, the incident detection criteria can be programmed to be more discriminating. For instance, security-related events (or series of events) that are well-understood by the security mechanism need not be reported to incident registration module 303 as an incident. This approach allocates the initial stage of incident analysis, namely, the identification of an incident requiring further analysis, to the client PC, which frees the event collection module 300 from having to respond to a multitude of trivial requests.

After discovery of a security incident, security services may already be responding to a detected threat such as an infection or policy violation. In some cases the solution may require measures such as a system recovery or treatment of an file. However, the root of the problem may lie deeper. A complete solution may not be possible without first determining how the incident occurred in the first place. Thus, for example, if the anti-virus engine detected malicious software, an understanding of where it was loaded from, or who else in the network is infected, may be needed. This type of more comprehensive understanding of the root of the security-related incident enables the system to search for a true solution to the original problem, not only for incidents which have been detected. Accordingly, in one type of embodiment, investigation into the root cause of the incident is a main purpose of event analysis module 301. Upon registration of an incident, the incident is passed to event analysis module 301, which gathers events associated with that incident. The events can be stored in an administrative database or in any other accessible information storage arrangement. Event collection module 300 is responsible for collecting the events; however, not all records are required for analysis.

For each incident having occurred on a client PC 100 and having been detected, the events preceding it are loaded and sorted in chronological order by event collection module 300. Event analysis module 301 constructs a chain of events that are causally related to the particular incident. The incident may be associated with an operating system object (e.g., file, process, network packet, account, memory, registry entry, a connected physical device, etc.). The chain of events is generally a subset of the events collected by event collection module 300. However, it should be noted that the chain of events will oftentimes include events that are not initially deemed to be associated with the incident. In this regard, the chain of events includes events that are gathered in additional event-gathering operations initiated after the first set of incident-related information is obtained.

Thus, in one embodiment, additional event-level information is obtained via request for additional events 225 directed to client PC 100 on which the incident was detected. In one example, the additional events are incorporated into one or more chains of events, the chain having one start event and one end event. The end event is the event which ultimately caused the incident to be detected and registered. The start event is an event that occurred before the others, and is determined to be related to the root cause of the incident. The start event is most likely an initial event.

Once a first chain of events in the computer device is reconstructed, event analysis module 301 checks for other events resulting from branching—such as events that are associated with other client PCs 100, other networked devices, or external devices (e.g., memory cards, external drives, mobile devices). Examples of branching include transfer of a file via email, copying or sharing of a file among multiple devices (or virtual devices e.g. user profiles), or writing of a file on a removable memory card. If any branching is found, then a corresponding chain of events is reconstructed for the device with which the branching has occurred. That chain of events is merged with the first chain of events (pre-branching). Thus, the branching creates a relationship between a plurality of computing devices, and the events associated with a detected incident resulting from this relationship are analyzed according to this embodiment.

The chain of events constructed from events associated with the incident (including those found through analysis of branching) may have more than one initial events. In various examples, the initial event is the downloading of a file from a malicious website, receiving and opening e-mail messages with malicious attachments, connection of an infected external storage, etc. Initial events may be predefined by their nature as being initial events. For example, any event that constitutes an externally-supplied change to the system (e.g., based on an object obtained from outside the local system) can be considered to be an initial event. For instance: the creation or addition of a new file, opening of a received email attachment, execution of a program or script for the first time, installation of a new program, implementation of an update to an existing application or operating system component, and the like.

In another embodiment, the causality of events is stored initially in the system log. In this case the log is structured as a table, list, or database, which represents causal relationships between records, such as object inheritance, the chronological sequence of entries, and other indicators. For example, if it is determined that a file is opened and that the file is harmful, investigation begins with the following data: the full name of the file, its checksum, its last modified date, and other parameters made available by the operating system. A table, list, or database is built that includes information about the user, the opened file, and the application program that opened the file.

In one approach, identification of a file-opening application that is unknown will trigger a new starting point for a parallel analysis, the purpose of which is to determine information about the origin of the application and level of trust given to that application, e.g., as measured by the number of users having access to the application and how often the application is run, as well as the source from which the application was downloaded or copied.

If the file-opening application is known and trusted, then the analysis proceeds to search for event data relating to the downloading of the file from a network location, and/or of event data relating to copying of the file. In one embodiment, if the file is stored on a removable storage device or copied from a removable storage device or medium such as a flash drive, USB stick, flash memory card, or optical disc, then the analysis includes a review of the storage device or medium, and a determination of computer systems on the local network that are currently accessing, or may have accessed, that particular storage device or medium.

In one type of embodiment, the result of each analysis can be a starting point for a new analysis that builds the chain of events, where the result of a previous analysis constitutes an input parameter for a new analysis.

Some chains of events will lead to events that are considered as not affecting the security of a computer system. These events include:
  operations by trusted applications;
  operations involving new devices, network resources, and objects, for which there an event log is lacking and for which there is insufficient knowledge in the expert system database;
  Events for which there are no entries in the event log due to their occurrence prior to establishment of the log, or due to exclusion of such events from logging based on specific settings.

In the case when the analysis concludes with one of the end-point events listed above, the analysis focuses on a time-wise approach. The database of system events is reviewed to identify events occurring close in time to the final event. These include network connections, launches of programs, and other such events. This continued analysis approach spawns a new chain of events that begins with the event(s) occurring close in time to the end-point event.

In a related embodiment, if a suspicious object is detected on a first computing device, but the above-described investigation proves inconclusive, the system proceeds to search other user profiles on the first computing device, or computing devices on the network for the presence of the suspicious object. Once the object is found on another one or more computing devices, the event logs of those devices are analyzed to gain further insight into how the suspicious object came to be, how the suspicious object is used, etc., on those respective computing devices. For example, a virus is detected on a first computer system, but on this machine it is not possible to analyze the event logs. In response to this situation, other computer systems are searched for the presence of the virus, and one or more chains of events are reconstructed on those respective computer systems. The scale of this approach in various embodiments may be limited to a single computing device, or a local network, but can also be extended include searching or obtaining information based on a global network of participating computing device using a central server having a direct connection to multiple different computing devices.

In one embodiment, the initial events are considered to be likely causes of the security-related incident, and corrective/preventive action to follow are designed to prevent further recurrence of the incident and correct its effects. These corrective/preventive operations are formulated by solution module 302.

Figure 3B:
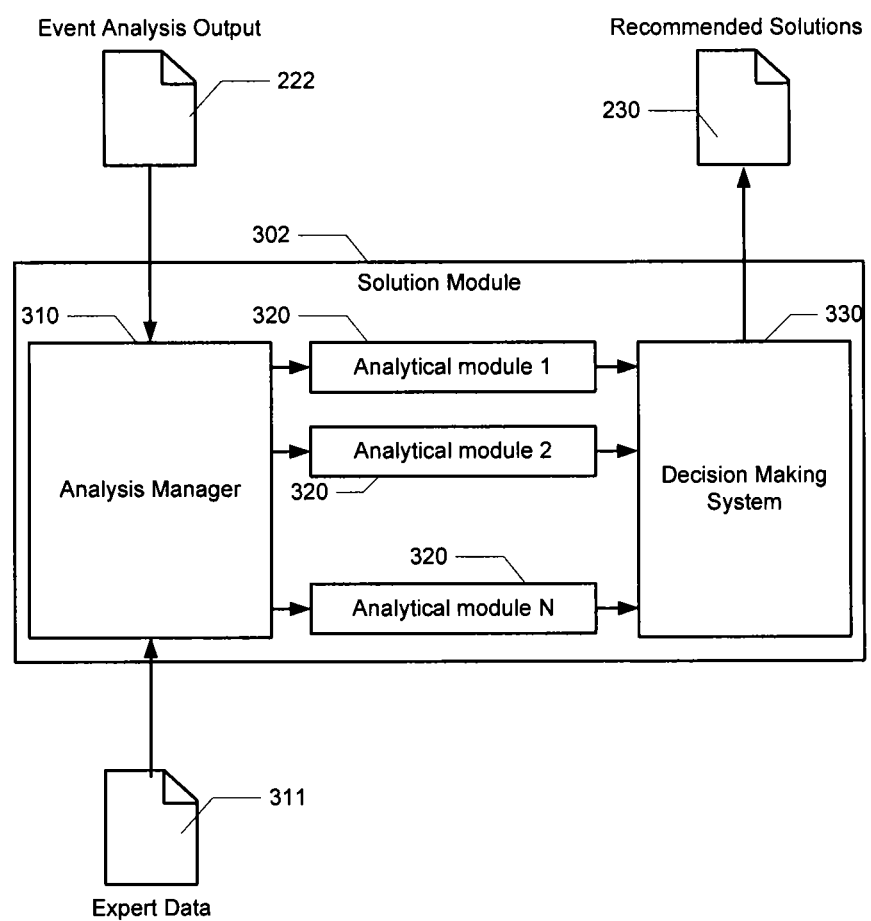
FIG. 3B is a block diagram illustrating a solution module that is implemented as part of the system of FIG. 3A according to one embodiment of the invention.

FIG. 3B is a diagram illustrating solution module 302 according to one embodiment. Analysis Manager 310 is an automated module that consolidates the output of the event analysis module 222 stored in administration database 120, with incident information stored in incident database 130, as well as expert data 311 from the expert system database 140. Solution module 302 includes several analytical modules 320, each of which implements an algorithm of decision making based on a characteristic (or set of characteristics). These algorithms can be changed or updated by updating the expert system database 140 without having to make changes to the structure of the solution module 302 itself.

The output of each analytical module 320 is fed into decision-making system 330. Each individual analytical module 320 is adapted to preferentially produce a single solution. The ultimate solution arrived at by decision-making system 330 is based on a selective combination of outputs of the various analytical modules 320. In one embodiment, individual analytical modules are given different levels of priority, which affects the weight given to each module's individual solution. Some analytical modules 320 use different data as parameters and solutions may not always collide, but rather supplement one another. For example, if the first analytical module 320 has decided to quarantine, the second analysis module 320 may decide independently whether to send the file for checkup to the anti-virus server 150, the third analytical module 320 may decide on the automatic application of certain other solutions. After processing all of these individual decisions, decision-making system 330 generates recommended solutions 230 and includes them in an incident report 230, which in turn is stored in the incident database 130, and sent to the administration server 110 after the specialist optionally approves the recommended action or chooses the most suitable one using console 160. In a variation of this embodiment, the system can be configured to automatically implement the recommendations. In this case, the stage of examination and approval of the specialist will be unneeded.

Figure 4A:
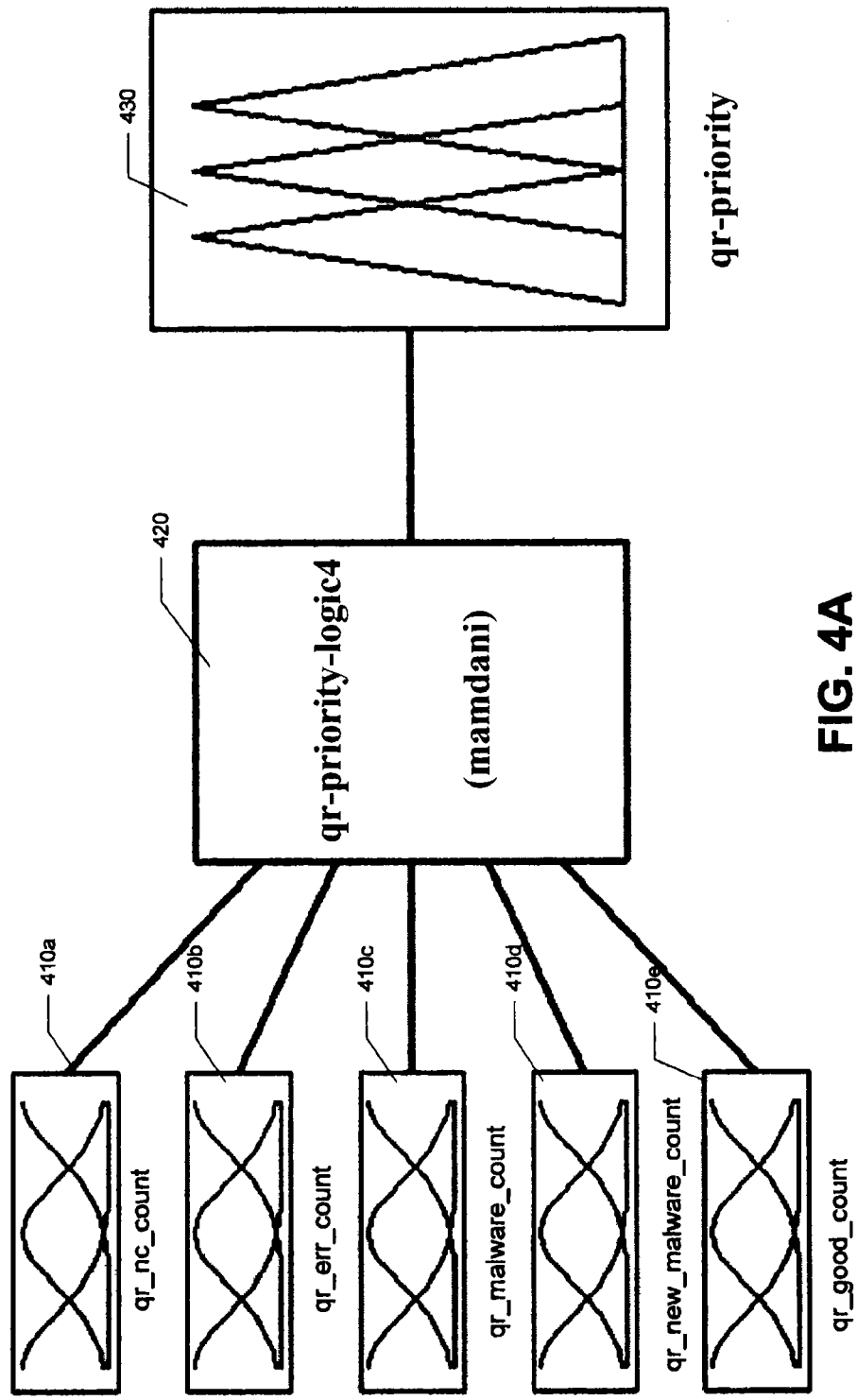
FIG. 4A illustrates an example of a fuzzy-logic system for use with one type of embodiment of the incident analyzer of FIG. 3.

As indicated above, it is contemplated that algorithms of the analytical modules 320 may be different from one module to the next. As an example, the algorithm of one of the modules is based on fuzzy logic. This analysis module must determine whether to send an analyzed file into quarantine and whether to send it for analysis to the anti-virus server 150. In this embodiment, a Mamdani type of fuzzy-logic algorithm is employed. In this case, the input signals are the information found in the metadata of the object, e.g., full name, size, information about the author, last modification time, attributes, etc. Referring now to FIG. 4A, the input data 410 of the analytical module 320 are indicated with the following reference numerals and defined as follows:
  410a: qr_nc_count—the number of files with similar metadata, which had previously been successfully sent to quarantine;
  410b: qr_err_count—the number of files with similar metadata the system sent to quarantine, but without success (a similar situation arises when the object is a registry entry or file which is copy-protected by special methods);

410c: qr_malware_count—the number of files with similar metadata, which have been successfully sent to quarantine (automatically or user-controlled) and after the study were considered harmful;

410d: qr_new_malware_count—the number of files with similar metadata, which have been successfully sent to the quarantine, automatic heuristics are not detected and after study were found to malicious;

410e: qr_good_count—the number of files with similar metadata, which have been successfully sent to the quarantine, and after the analysis had been recognized as legitimate.

None of the indicators allow one to make a single decision and indeed, in most cases, there is competition between inputs wherein the majority of these indicators are not equal to zero. For example, consider a file that has previously been encountered several times and has in some cases been recognized as clean, in other cases viewed as malicious, and in each case, the situation was unique and required one single decision. Sending the file to quarantine in view of these circumstances is unwise.

This scenario is not uncommon. Oftentimes, for each incident, a very large number of files is collected and becomes very difficult to handle. Among all of them, only a few files (2-3) are of any real interest.

Figure 4B:
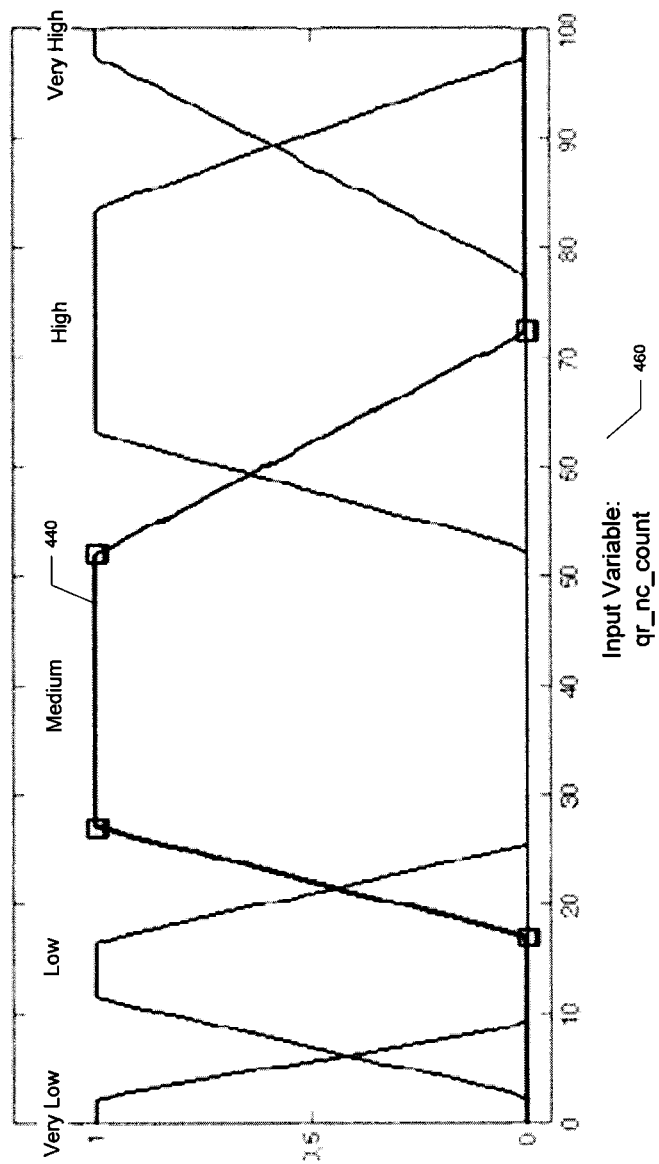
FIG. 4B illustrates a classification function of the fuzzy-logic system of FIG. 4A.

FIG. 4B illustrates the membership(belonging-to) function according to one embodiment. For each of the input variables 460, linguistic variables are defined, and for each variable terms are defined. For example, "Very Low", "Low", "Medium", "High", "Very High," with membership functions 440 defined for each term. With the help of membership functions 440 one can perform an operation called "Fuzzification", i.e., reduction to fuzzy variables. If 40 new malicious programs are discovered for a file with such metadata, then this corresponds to "Medium". The expert makes rules like the following:

If {the number of new malicious programs high}
   Then {the need to quarantine is very high}.

The rules are simple and are written in natural language. Thus, the expert can easily formulate such rules, as they are easy to analyze and verify. Moreover, the "high" number of malicious programs is currently considered to be five, but after some time, this value may increase to five hundred. This should be considered carefully at the stage of fuzzification. Membership functions 440 are easy to edit for their applicability to the current circumstances, without changing the rules, and vice versa. Inside the system the rules may take the following form according to one embodiment:

If (qr-nc-count is high) then (qr-priority is low) [0.15]
If (qr-nc-count is very-high) then (qr-priority is low) [0.15]
If (qr-err-count is very-low) then (qr-priority is high) [0.6]
If (qr-err-count is low) then (qr-priority is med) [0.6]
If (qr-err-count is med) then (qr-priority is low) [0.1]
If (qr-err-count is high) then (qr-priority is low) [0.1]
If (qr-malware-count is very-low) then (qr-priority is low) [1]
If (qr-malware-count is low) then (qr-priority is low) [1]
If (qr-malware-count is med) then (qr-priority is med) [1]
If (qr-malware-count is high) then (qr-priority is very-high) [1]
If (qr-malware-count is very-high) then (qr-priority is very-high) [1]
If (qr-new-malware-count is och low) then (qr-priority is low) [0.25]
If (qr-new-malware-count is low) then (qr-priority is med) [0.25]

Numbers in square brackets are weight coefficients that indicate the priority and importance of the rules. In the system, there are usually 20-30 rules, based on which the decision is made. Next is the inverse operation—defuzzification 430, in the process of which precise numbers are calculated, for example "0" to "100". "0" means that quarantine is not necessary, but the opposite value of "100" means that one must send the file to quarantine and analyze it with the highest priority.

Figure 5A:
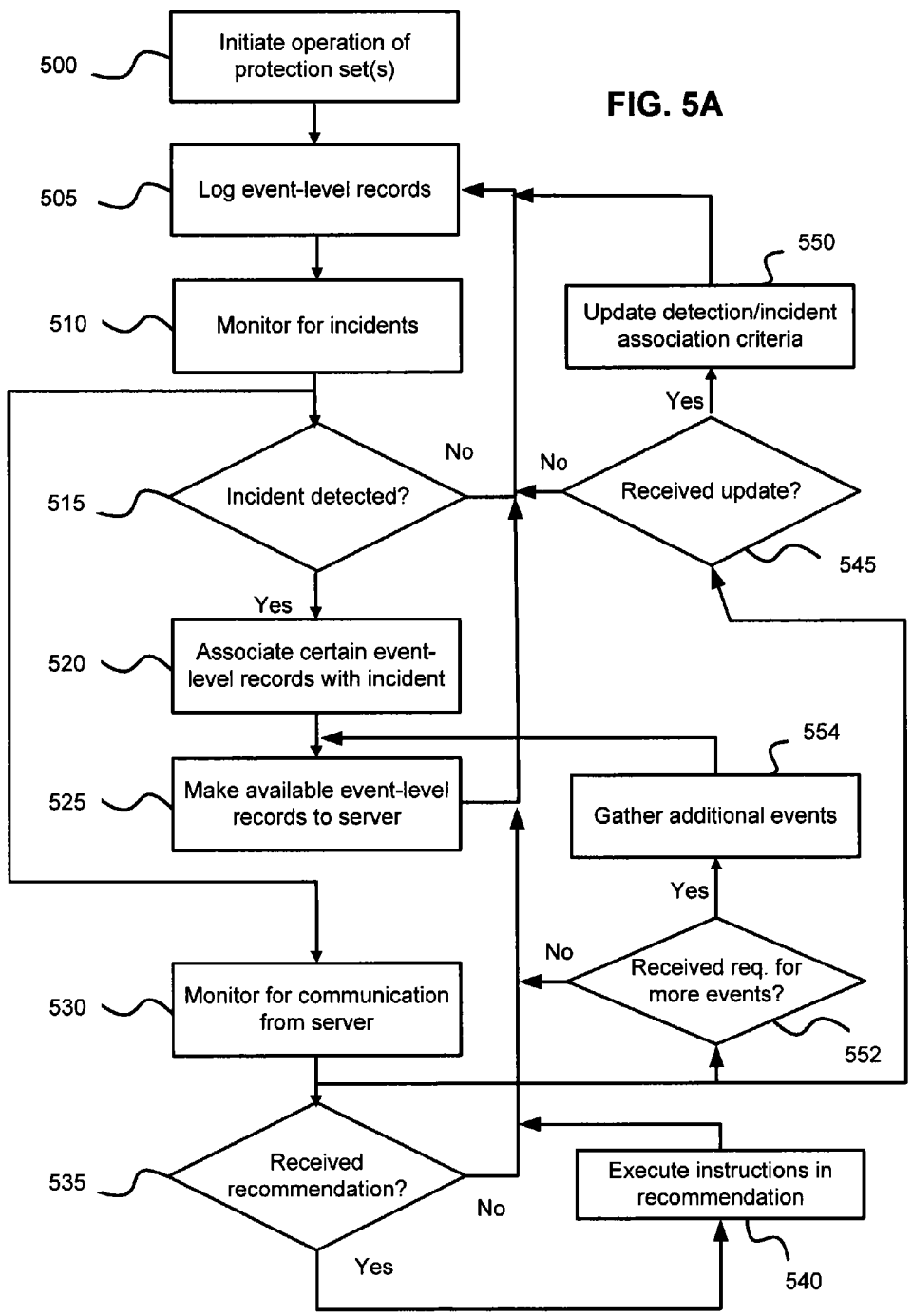
FIGS. 5A and 5B are flow diagrams illustrating, respectively, client-side and server-side processes for automatically responding to incidents utilizing a system according to some embodiments of the invention.
Figure 5B:
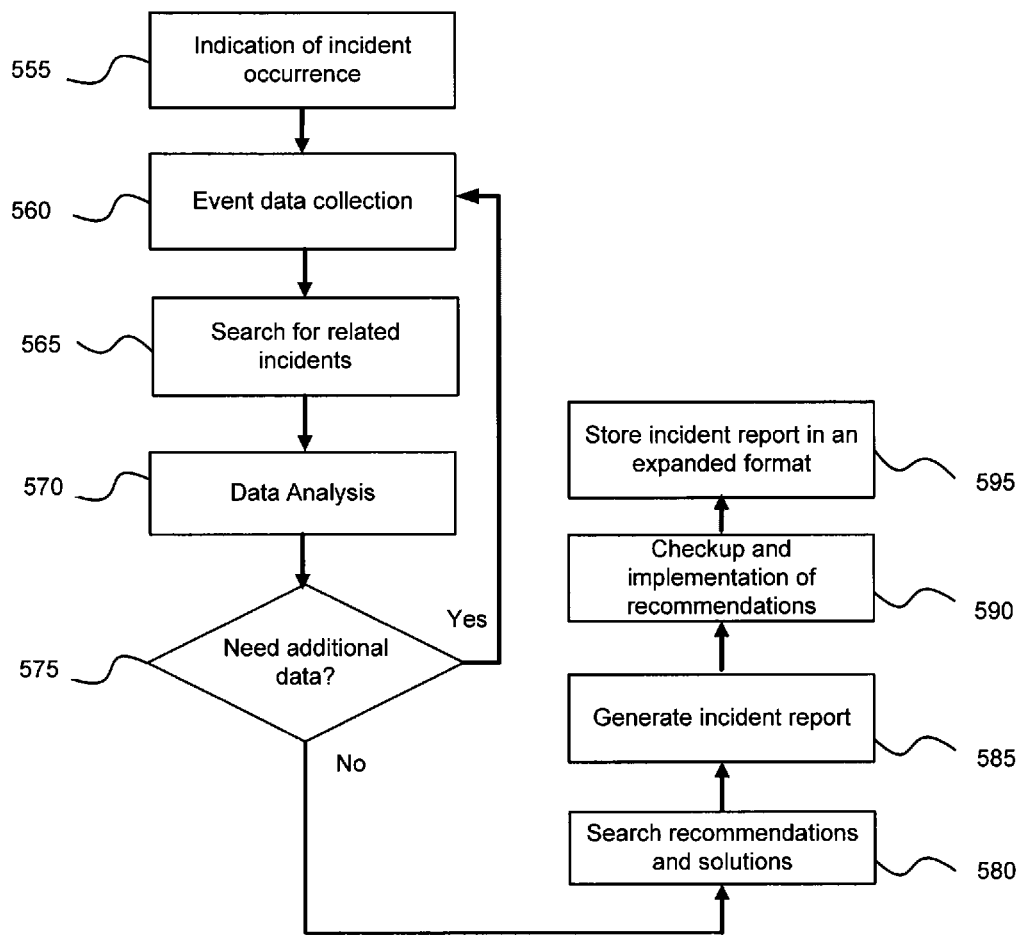

FIGS. 5A and 5B are flow diagrams illustrating, respectively, client-side and server-side processes for automatically responding to incidents utilizing a system according to some embodiments of the invention. The client-side operation of FIG. 5A begins at 500 with initiation of protection sets 210. Protection sets 210 (or a separate module in client computer 100) log event-level records that may be processed by protection sets 210, and may log other event-level information relating to operation of other modules or components of client computer 100. Processing of the event-level records generally involves intercepting commands, functions (e.g., API-functions), reading of memory and program files, and any other suitable interaction with objects of the operating system. One important function of protection sets 210 is to identify and track security incidents such as events that violate security policies and constitute a threat to PCs 100 and the computer network in general.

Accordingly, at 510, protection sets 210 monitor activity on client computer 100 for the occurrence of incidents based on incident detection criteria. At 530, communications from the server side are monitored.

If an incident is detected at decision 515, certain selected events from the log are associated with the incident based on incident associating criteria at 520. The selected events may be associated using any suitable technique according to various embodiments, such as, for instance, flagging individual logged events with an incident identifier, or storing copies of the selected events in a separate file or data structure that has a binding to a record of the incident, or that stores the incident record along with the events associated therewith. In various embodiments, different bases for associating events with incidents are implemented. For instance, in one such embodiment, events that preceded the detection of the incident by a certain predefined time duration, or a set quantity of events preceding the detection of the incident, are automatically associated with that incident. In another example embodiment, all events preceding the incident (collected in reverse order of occurrence) up to, and including, an initial event (or a predefined quantity of initial events), are associated with the incident.

At 525, the incident and associated event-level information are provided to the server side for analysis. Provision of this information may be a transmission containing all of the information which is initiated by client computer 100, or may be achieved in other ways, such as by providing a simple transmission with a notice to the server side, which prompts the server to retrieve the logged information.

Besides monitoring local activity in response to network requests from the server, the client PC can receive from the server recommendations to correct the consequences of incidents, an update command, or a request for more event data. Thus, for instance, at 535, if a communication from the server is received that includes a recommendation for corrective action in response to an incident, client PC 100 executes that instruction at 540. This communication can be received by remote configuration module 215, which may parse the communication and pass appropriate instructions (e.g., in the form of scripts) to each corresponding protection set 210, or the communication can be received by the protection sets 210 themselves, according to various embodiments. If an update from the server is received at 545 to update either the detection criteria, or the incident association criteria, or both, the update is carried out at 550. In one embodiment, the update is handled by the remote configuration module 215. If a request for additional event data is received at 552, the additional event data is gathered at 554.

Turning now to FIG. 5B, operation of the server side begins at the time when indication of the occurrence of an incident is received at 555. Detecting of incidents occurs through an array of detectors that are installed on client PCs 100 in the protection sets 210. Detection of an incident may also be achieved by the server based on correlation of multiple system reports collected from multiple PCs. Once an incident is detected (on the server or client) data is collected by the administration server about the incident at 560. This data may be provided to the administration server together with the indication of the incident, or may be transmitted as a separate interaction. In one embodiment, initial data collected that is associated with the incident is a relatively small set of parameters, such as detection time of the incident, the name of the PC on the network, the name of the authorized user, the type of incident and event log information preceding detection of the incident, as described above.

At 565, related incidents are searched for in the incidents database 130. These may be registered on the computer, may have occurred due to the user's fault, have the same type of classification, or may be due to familiar malware that has been detected previously elsewhere. At 570, analysis is performed of the data representing the current incident and any retrieved historic incidents. Various examples of this analysis include verifying validity of the data, comparing the incident to related past incidents or events, determining the cause of the incident, and preparing a detailed incident report at 575.

There may be a need for additional data, such as, for example, the event log's latest entries, the serial numbers of connected external devices, and a history of visited Web sites, in order to better establish the causes of violations of security policy. The system may also recognize a need to test whether a particular problem is widespread among multiple PCs, or among PCs of different branches of the network. Accordingly, at 575, in one embodiment, additional data may be requested from specific PCs other than the PC on which the incident was initially detected. The additional data is requested according to one embodiment in response to a determination, by any one of the analytical modules, 320, that additional information is needed in order to fully apply its respective decision criteria. In this case, the incident analyzer module passes a request for the additional information to the administration server 110, which in turn prompts individual ones (or groups of) client PCs 100 to provide that information.

In one specific embodiment, prior to being requested at 575, the additional information, was not associated with the detected incident. In a related embodiment, individual ones (or groups of) client PCs 100 are subsequently updated with event-incident associations so that in future incidents with are similar to the incident having been analyzed above, information of the type which was requested additionally at 575 is automatically provided by client PCs 100, thereby avoiding the cycle of additional requests for such information.

After evaluating the incident and collecting all the necessary parameters, a search of the recommendations and decisions 580 is performed. This process occurs in the solution module 302 in with the assistance of expert data. Cause-and-effect algorithms implemented in the analytical modules 320 may be constructed in different ways—statistical, logical, fuzzy logic, functional, and others. Information about any found solutions and recommendations is added to the incident report which is generated at 585, making it easier to present to the security administrator. The report may include information about the incident, such as a description of the incident, the events leading up to the emergence of the incident, actions automatically taken and recommended actions to take in the future.

In one embodiment, prior to transmitting the corrective actions to the client PCs 100, the new recommendations may be reviewed in an approval process by a human expert, in which the most suitable solution(s) are selected from among any alternatives if any are offered. The recommendations for corrective action are transmitted to each affected client PC, or immunization instructions are transmitted to all susceptible client PCs 100 at 590. Implementation of the decisions and recommendations may be used in automatic mode, if it is set up in the system settings that way, or run by the security administrator based on a human review of the incident report. Ultimately, at 595, the incident report is stored in the incidents database 130. The resulting report contains data collected about the incident, additional information, recommendations made and actions carried out, along with administrative measures.

In one embodiment, the incident report includes information that is specific to the client PC 100 on which the incident was first detected, along with the corrective action determined at block 585, which is also specific to that client PC 100. The specific information pertaining to that client PC 100 can include information regarding the hardware or software configuration of client PC 100.

Likewise, in a related embodiment in which the recommendations for corrective action are automatically implemented, the recommendations for corrective action may be formulated in a specific manner based on the specific hardware or software configuration of the particular client PC 100. Thus, for instance, the recommendations may be tailored to the specific operating system or set of applications which may be affected by the incident and require correction. These types of recommendations may specify certain files to be repaired in a certain manner; or may include specific software instructions to be executed on the PC 100 (e.g., scripting, source code to be run by an interpreter, object or executable code, etc.).

In another embodiment, the information in the recommendations for corrective action is not specific to any particular client PC 100. In one such implementation, the recommendations are formulated or expressed at a higher level than in the embodiment described above. Thus, for example, the recommendations for corrective action may specify correction of a file having certain characteristics (e.g., certain content), and leaving the process of determining the presence or locating the file to be executed by each PC 100. These types of recommendations for corrective action may be widely disseminated to a number of different PCs 100 in the network by administration server 110, with each PC 100 determining whether, and how to apply the corrective action. In one type of implementation, the recommendations for corrective action are formulated with conditions that specify corrective actions to be preformed if certain criteria are met. In a related embodiment, recommendations for corrective action are formulated to be executed by remote configuration module 215, which in turn is configured to select and adapt the recommendations to suit the local hardware or software configuration.

FIG. 6 is a diagram illustrating an example of general-purpose computer system 600 on which aspects of the invention as described herein may be implemented according to various embodiments. The computer system 600 may include a computing device such as a personal computer 602. The personal computer 602 includes one or more processing units 604, a system memory 606, a video interface 608, an output peripheral interface 610, a network interface 612, a user input interface 614, removable 616 and non-removable 618 memory interfaces and a system bus or high-speed communications channel 620 coupling the various components. In various embodiments, the processing units 604 may have multiple logical cores that are able to process information stored on computer readable media such as the system memory 606 or memory attached to the removable 616 and non-removable 618 memory interfaces 618. The computer 602 system memory 606 may include non-volatile memory such as Read Only Memory (ROM) 622 or volatile memory such as Random Access Memory (RAM) 624. The ROM 622 may include a basic input/output system (BIOS) 626 to help communicate with the other portion of the computer 602. The RAM 624 may store portions of various software applications such as the operating system 628, application programs 630 and other program modules 632. Further, the RAM 624 may store other information such as program or application data 634. In various embodiments, the RAM 624 stores information that requires low-latencies and efficient access, such as programs and data being manipulated or operated on. In various embodiments RAM 624 comprises Double Data Rate (DDR) memory, Error Correcting memory (ECC) or other memory technologies with varying latencies and configurations such as RAMBUS or DDR2 and DDR3. In this way, in various embodiments, the system memory 606 may store the input data store, access credential data store, operating memory data store, instruction set data store, analysis result data store and the operating memory data store. Further, in various embodiments, the processing units 604 may be configured to execute instructions that limit access to the aforementioned data stores by requiring access credential before access to the information is granted.

The removable 616 and non-removable 618 memory interfaces may couple the computer 602 to disk drives 636 such as security serverD or rotational disk drives. These disk drives 636 may provide further storage for various software applications such as the operating system 638, application programs 640 and other program modules 642. Further, the disk drives 636 may store other information such as program or application data 644. In various embodiments, the disk drives 636 store information that doesn't require the same low-latencies as in other storage mediums. Further, the operating system 638, application program 640 data, program modules 642 and program or application data 644 may be the same information as that stored in the RAM 624 in various embodiments mentioned above or it may be different data potentially derivative of the RAM 624 stored data.

Further, the removable non-volatile memory interface 616 may couple the computer 602 to magnetic portable disk drives 646 that utilize magnetic media such as the floppy disk 648, Iomega® Zip or Jazz, or optical disk drives 650 that utilize optical media 652 for storage of computer readable media such as Blu-Ray®, DVD-R/RW, CD-R/RW and other similar formats. Still other embodiments utilize security serverD or rotational disks housed in portable enclosures to increase the capacity of removable memory.

The computer 602 may utilize the network interface 612 to communicate with one or more remote computers 656 over a local area network (LAN) 658 or a wide area network (WAN) 660. The network interface 612 may utilize a Network Interface Card (NIC) or other interface such as a modem 662 to enable communication. The modem 662 may enable communication over telephone lines, coaxial, fiber optic, powerline, or wirelessly. The remote computer 656 may contain a similar hardware and software configuration or may have a memory 664 that contains remote application programs 666 that may provide additional computer readable instructions to the computer 602. In various embodiments, the remote computer memory 664 can be utilized to store information such as identified file information that may be later downloaded to local system memory 606. Further, in various embodiments the remote computer 656 may be an application server, an administrative server, client computers, or a network appliance.

A user may enter information to the computer 602 using input devices connected to the user input interface 614 such as a mouse 668 and keyboard 670. Additionally, the input device may be a trackpad, fingerprint scanner, joystick, barcode scanner, media scanner or the like. The video interface 608 may provide visual information to a display such as a monitor 672. The video interface 608 may be an embedded interface or it may be a discrete interface. Further, the computer may utilize a plurality of video interfaces 608, network interfaces 612 and removable 616 and non-removable 618 interfaces in order to increase the flexibility in operation of the computer 602. Further, various embodiments utilize several monitors 672 and several video interfaces 608 to vary the performance and capabilities of the computer 602. Other computer interfaces may be included in computer 602 such as the output peripheral interface 610. This interface may be coupled to a printer 674 or speakers 676 or other peripherals to provide additional functionality to the computer 602.

Various alternative configurations and implementations of the computer 602 are within the spirit of the invention. These variations may include, without limitation, additional interfaces coupled to the system bus 620 such as universal serial bus (USB), printer port, game port, PCI bus, PCI Express or integrations of the various components described above into chipset components such as the northbridge or southbridge. For example, in various embodiments, the processing unit 604 may include an embedded memory controller (not shown) to enable more efficient transfer of data from the system memory 606 than the system bus 620 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A security server for responding to security-related incidents in a computer network including a plurality of client computers, the security server comprising:
   an event collection module communicatively coupled to the computer network, an event analysis module operatively coupled to the event collection module, and a solution module operatively coupled to the event analysis module;
   wherein the event collection module is configured to obtain incident-related information that includes event-level information from at least one client computer of the plurality of client computers, the incident-related information being associated with at least a first incident which was detected by that at least one client computer and provided to the event collection module in response to that detection;
   wherein the event analysis module is configured to reconstruct at least one chain of events causally related to the first incident and indicative of a root cause of the first incident based on the incident-related information; and
   wherein the solution module is configured to formulate at least one recommendation for automatic implementation by the at least one client computer, the at least one recommendation being based on the at least one chain of events, and including corrective/preventive action particularized for automatically responding to the first incident.

2. The security server of claim 1, wherein the incident-related information is limited to including essentially event-level information that is associated with the first incident.

3. The security server of claim 1, wherein the at least one recommendation for corrective action includes (a) a natural language part that describes the first incident, and (b) a corrective action part that includes instructions to be carried out on the at least one client computer for resolving the first incident.

4. The security server of claim 3, wherein the natural language part includes a report that describes the corrective action part in a natural language expression.

5. The security server of claim 3, wherein the corrective action part includes instructions specific to an individual client computer on which the first incident was detected.

6. The security server of claim 3, wherein the corrective action part includes instructions that are applicable to a plurality of different client computers.

7. The security server of claim 3, wherein the corrective action part includes instructions that are adapted to be automatically implemented by at least one client computer.

8. The security server of claim 1, wherein the solution module comprises:
   a plurality of analytical modules, each configured to apply distinct decision criteria and to produce a corresponding output representing at least one suggestion for responding to the first incident; and
   a decision-making system that collects the output of each of the plurality of analytical modules and selectively combines those outputs to produce the at least one recommendation for responding to the first incident.

9. The security server of claim 8, further comprising:
   an incidents database communicatively coupled with the solution module, the incidents database storing the pre-existing collection of known incident data, which includes event-level information and descriptive information associated with the known incidents; and
   an expert system database communicatively coupled to the solution module, and storing the decision criteria.

10. The security server of claim 1, wherein the security server is configured to:
    determine whether additional event-level usage history information from the at least one client computer relating to the first incident is needed for analysis of the first incident; and
    in response to a determined need for the additional usage history information, cause the event collection module to request the additional usage history information from the at least one client computer.

11. The security server of claim 10, wherein the security server is configured to request additional usage history information from a client computer that is different from a client computer on which the first incident has been detected.

12. The security server of claim 1, wherein the chain of events includes events relating to transfer of information between multiple client computers.

13. The security server of claim 1, wherein the first incident was detected at a first client computer, and wherein the solution module is configured to formulate the at least one recommendation for responding to the first incident for use by a second client computer on which the first incident has not been detected.

14. The security server of claim 1, wherein the security server is configured to control a set of parameters at each of the at least one client computer, the set of parameters defining at least one of: incident detection rules, rules for applying corrective/preventive actions, or any combination thereof.

15. A machine-implemented method for automatically responding to security-related incidents at a client computer that includes computer hardware operating under program control, the method comprising:
    operating, by the client computer, at least one protection set module that is adapted to protect information stored at the client computer and to detect occurrences of security-related incidents;
    logging, by the client computer, event-level records representing activity of the at least one protection set module;
    detecting, by the at least one protection set module, an incident impacting information security at the client computer, the detecting being performed based on incident detection criteria;
    in response to the detecting of the incident, associating, by the client computer, selected ones of the event-level records with the incident, the associating being performed based on incident associating criteria;
    providing, by the client computer, the selected ones of the event-level records to a remote server to be analyzed;
    receiving, by the client computer, at least one recommendation for corrective action to be automatically carried out at the client computer, the recommendation for corrective action being received from the remote server, and including instructions for resolving the incident; and
    automatically executing, by the client computer, the instructions for resolving the incident;
    receiving, by the client computer, an instruction to update at least one of: the incident detection criteria, the incident associating criteria, or a combination thereof, with a new set of respective criteria.

16. The method of claim 15, wherein providing the selected ones of the event-level records to a remote server includes initiating, by the client computer, a transmission to the remote server that includes an indication that the incident has been detected.

17. The method of claim 15, further comprising:
receiving, by the client computer, at least one recommendation for corrective action to be carried out at the client computer, the recommendation for corrective action being received from the remote server, and including instructions for resolving a different incident which has been detected at a different client computer.

18. The method of claim 15, wherein receiving the instruction to update at least one of: the incident detection criteria, the incident associating criteria, or a combination thereof, is in response to a communication originated from the remote server and is based on the recommendation for corrective action.

19. The method of claim 15, wherein receiving the at least one recommendation includes receiving a natural language report that describes the detected incident.

20. The method of claim 15, further comprising:
receiving, by the client computer, an instruction to provide additional event-level records that have not been associated with the incident.

21. The method of claim 15, wherein receiving the at least one recommendation for corrective action includes receiving instructions for resolving the incident that are machine-executable and tailored to a specific configuration of the client computer.

22. The method of claim 15, wherein receiving the at least one recommendation for corrective action includes receiving instructions for resolving the incident that are not client computer-specific; and
wherein executing the instructions for resolving the incident includes determining, by the client computer, applicable instructions to be carried out.

* * * * *